Oct. 19, 1965     O. K. KELLEY     3,212,514

GOVERNOR FOR AUTOMATIC TRANSMISSIONS

Original Filed April 29, 1955

INVENTOR.
Oliver K. Kelley
BY
W. C. Middleton
ATTORNEY

United States Patent Office 3,212,514
Patented Oct. 19, 1965

3,212,514
GOVERNOR FOR AUTOMATIC TRANSMISSIONS
Oliver K. Kelley, Bloomfield Hills, Mich., assignor to General Motors Corporation, Detroit, Mich., a corporation of Delaware
Original application Apr. 29, 1955, Ser. No. 504,992, now Patent No. 3,023,636, dated Mar. 6, 1962. Divided and this application Feb. 23, 1962, Ser. No. 175,175
3 Claims. (Cl. 137—56)

This invention relates to governors and more particularly to hydraulic governors of the type employed in automatic transmissions.

The present application is a division of copending S.N. 504,992 filed April 29, 1955, now Patent No. 3,023,636 granted March 6, 1962, and assigned to the same assignee as the present application. The disclosure of such copending application is incorporated herein by reference and parts thereof necessary to the understanding of this invention have been divided therefrom.

An object of the present invention is to provide a governor for an automatic transmission, the governor being of such type that the pressure developed thereby due to output shaft speed varies in three stages.

Another object of the invention is to provide a governor which can be mounted to rotate with the output shaft, which governor is of such size to occupy a minimum of space.

Other features, objects and advantages of the present invention will become apparent by referring to the following detailed descriptions of the following drawings wherein.

Figure 1:
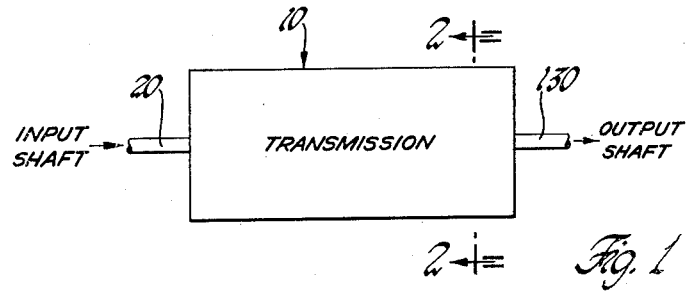
FIGURE 1 is a schematic representation of a transmission such as that disclosed in the before identified copending application.
Figure 2:
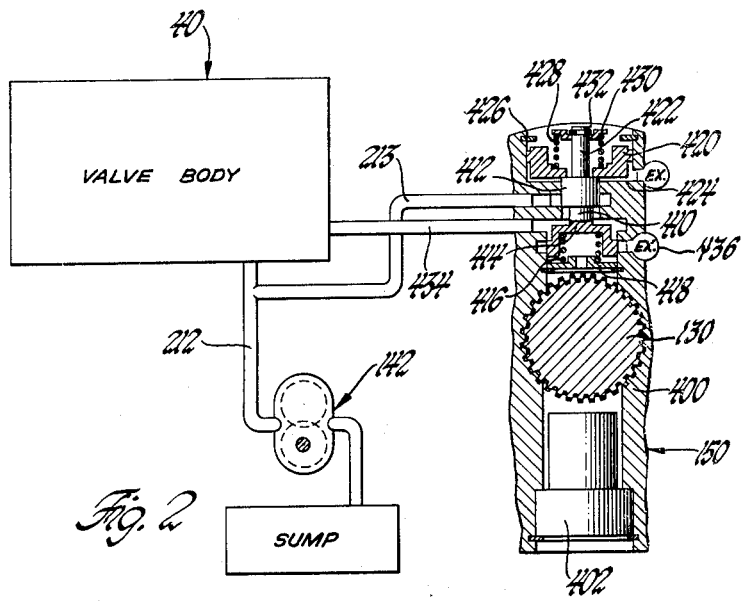
FIGURE 2 is a fragmentary section enlarged to show the necessary elements of the invention which section is taken substantially on the line 2—2 of FIGURE 1.

Referring now to the drawings and to FIGURE 1, 10 illustrates diagrammatically an automatic transmission which may be of the type disclosed in the said copending application, but which may be of any well-known type in which use is made of a governor developing pressure which varies with output shaft speed of rotation. The input shaft of the transmission is indicated at 20 while the output shaft is indicated at 130. Secured to the output shaft within the transmission housing is a governor 150.

When the output shaft of the transmission is rotating, the governor 150 is caused to revolve to develop a varying pressure which increases with increase in the speed of rotation of the transmission output shaft 130. The governor 150 comprises a body 400 rotated by output shaft 130 and having a radially extending bore in which a regulator valve is mounted and also an oppositely disposed counterbalance 402. The regulating valve which revolves as the body 400 is rotated comprises a valve member 410 having spaced lands 412 and 414 the latter of which is of stepped diameters. The bore in which this valve slides is of proper diameter to receive the lands 412 and 414. Land 414 hollowed out to receive a spring 416 the inner end of which rests against an abutment 418. In conjunction with the valve 410 use is made of an annular weight 420 orificed for the passage of the stem 422 extending from the land 412. The weight 420 is slidable in an enlarged part of the bore between a shoulder 424 and a snap ring 426 fitting in an internal groove in the bore. Spring 428 has one end seated against weight 420 and the other end against a collar 430 fitting on the stem 422 and retained in place by spring ring 432.

Figure 3:
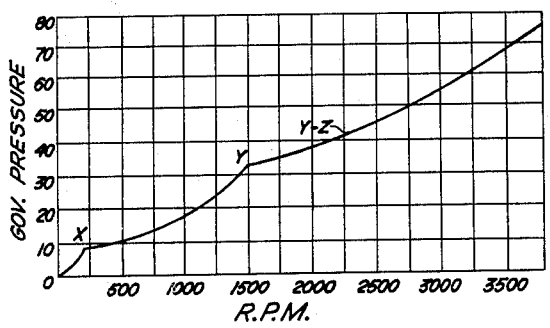
FIGURE 3 is a chart showing the manner in which governor pressure varies in three stages.

When the pump 142 is operating, oil from this pump is supplied by the branch line 213 from line 212 to a port in the bore of the governor valve, which port is opened by the spring 416, when the governor is not being rotated, forcing the valve 410 outwardly. With the land 412 moving outwardly, oil can continue from line 213 through the bore of the governor valve and out through line 434 to parts of the mechanism, particularly to parts located in valve body 40. As soon as the pressure developed in line 434 exceeds the pressure supplied by the spring 416, the hydraulic pressure acting on the area of land 414 in excess of the area of land 412 moves the member 410 inwardly, first closing the port connected to line 213 and next opening the port connected to exhaust passage 436. In this the first stage of operation by the governor, the governor pressure developed by the governor valve rises at a fairly rapid rate as indicated by the curve extending from zero to point X on the chart comprising FIGURE 3 of the drawing. This pressure rise is determined solely by rise of rear pump pressure due to increase in its speed of operation.

As the governor valve is rotated by rotation of the output shaft 130, the pressure developed in line 434 increases at a rate which is determined by the effect of centrifugal force on the mass of the valve 410 and on the weight 420, which centrifugal force is augmented by the pressure of spring 416. Thus as the governor valve body rotates and the valve 410 revolves about output shaft 130, these forces moving the valve member outwardly determine the hydraulic pressure which is required to move the valve member inwardly to close the inlet port and then open the exhaust port. It will be understood that in all stages of governor operation the valve member reciprocates through a relatively short range of movement from a position opening the inlet port to a position opening the exhaust port. The centrifugal force exerted on the weight 420 is communicated to the valve member 410 by the spring 428 which is progressively contracted as the weight 420 moves outwardly. During the second stage of regulation by the governor valve the metered pressure developed thereby increases from the point X to the point Y on the chart of FIGURE 3. At the end of this stage, the weight 420 will be at its outermost position against the snap ring 426.

In the third stage of regulation of governor pressure the weight 420, being held against further movement outwardly, exerts a constant force on the member 410 through the spring 428. As the speed of rotation of the output shaft increases during the third stage, the regulated pressure increase will be due to the constant force exerted by the weight 420, the constant force exerted by the spring 416 and centrifugal force on the entire body of the member 410. The pressure therefore in the third stage rises at a different rate than in stages one and two. This third stage extends from the point Y of FIGURE 3 at a progressive rate as indicated by the line Y–Z with the result that the pressure developed by the governor will eventually equal pump pressure at a high output shaft speed.

I claim:
1. In a transmission of the type described, a source of fluid under pressure, a regulating valve body rotated by a part of said transmission, said body having a bore therein, an inlet port for said bore connected to said source, an outlet port for said bore in spaced relation to said inlet port, a valve member slidable in said bore and revolving about the axis of rotation of said body, said valve member being moved outwardly by centrifugal force to establish communication between said inlet and outlet ports, a part of said valve member being subject to pressure developed in said outlet port and movable in response thereto to cause said valve member to close said inlet port, the pressure in said outlet port increasing in three stages in accordance with the speed of rotation of said body, a weight member movable with said valve member within predetermined limits, and a spring member aiding centrifugal force on said valve member and said weight in the initial stage of pressure rise, centrifugal force on said valve member and said weight serving to determine the pressure developed in said second stage, and centrifugal force on said valve member alone determining pressure rise in said third stage.

2. In a transmission of the type described, a source of fluid under pressure, a regulating valve body rotated by a part of said transmission, said body having a bore therein, an inlet port for said bore connected to said source, an outlet port for said bore in spaced relation to said inlet port, an exhaust port for said bore in spaced relation to said outlet port, a valve member slidable in said bore and revolving about the axis of rotation of said body, said valve member being moved outwardly by a centrifugal force to open said inlet port and thereby to establish communication between said inlet and outlet ports, a part of said valve member being subject to pressure developed in said outlet port and movable inwardly in response thereto to cause said valve member to close said inlet port and to open said exhaust port for the escape of fluid from said outlet port, the pressure in said outlet port increasing in three stages in accordance with the speed of rotation of said body, a weight member movable with said valve member within predetermined limits, a spring member aiding centrifugal force on said valve member and said weight in the initial stage of pressure rise, centrifugal force on said valve member and said weight determining the pressure developed in said second stage, and centrifugal force on said valve member alone determining pressure rise in said third stage.

3. In a transmission of the type described, a source of fluid under pressure, a regulating valve body rotated by a part of said transmission, said body having a bore therein, an inlet port for said bore connected to said source, an outlet port for said bore in spaced relation to said inlet port, an exhaust port for said bore in spaced relation to said outlet port, a valve member slidable in said bore and revolving about the axis of rotation of said body, said valve member being moved outwardly by a centrifugal force to close said exhaust port and open said inlet port thereby to establish communication between said inlet and outlet ports, a part of said valve member being subject to pressure developed in said outlet port and movable inwardly, response thereto to cause said valve member to close said inlet port and to open said exhaust port for the escape of fluid from said outlet port, the pressure in said outlet port increasing in three stages in accordance with the speed of rotation of said body, a weight member movable with said valve member within predetermined limits, a spring member aiding centrifugal force on said valve member and said weight to cause an initial stage of rapidly rising pressure in said outlet port, centrifugal force on said valve member and said weight serving to determine pressure rising at a different rate in said second stage, and a stop for arresting outward movement of said weight member at the end of said second stage whereby centrifugal force on said valve member alone determines pressure rise at another different rate in said third stage.

References Cited by the Examiner
UNITED STATES PATENTS

| | | | |
|---|---|---|---|
| 2,588,140 | 3/52 | McFarland | 137—56 X |
| 2,693,810 | 11/54 | McFarland | 137—54 X |
| 2,876,784 | 3/59 | Adams | 137—56 |
| 3,032,049 | 5/62 | Schulz | 137—56 |
| 3,048,184 | 8/62 | Duffy | 137—54 X |
| 3,049,028 | 8/62 | English | 137—56 X |

ISADOR WEIL, *Primary Examiner.*